Jan. 22, 1952 A. W. ECKSTROM 2,583,364
APPARATUS FOR SUPPLYING AND DISTRIBUTING LIQUIDS
Filed July 1, 1949 2 SHEETS—SHEET 1

INVENTOR.
Albert W. Eckstrom
BY Popp and Popp
Attorneys.

Jan. 22, 1952     A. W. ECKSTROM     2,583,364
APPARATUS FOR SUPPLYING AND DISTRIBUTING LIQUIDS
Filed July 1, 1949     2 SHEETS—SHEET 2

INVENTOR.
Albert W. Eckstrom
BY Popp and Popp
Attorneys.

Patented Jan. 22, 1952

2,583,364

UNITED STATES PATENT OFFICE 2,583,364

APPARATUS FOR SUPPLYING AND DISTRIBUTING LIQUIDS

Albert W. Eckstrom, Buffalo, N. Y., assignor to Blaw-Knox Company, Pittsburgh, Pa., a corporation of New Jersey Application July 1, 1949, Serial No. 102,594

1 Claim. (Cl. 159—1)

This invention relates to apparatus for supplying and distributing liquids. It particularly relates to apparatus for supplying and evenly distributing liquids in liquid treatment apparatus.

It is an object of the present invention to provide liquid supply and distribution apparatus by which liquids may be discharged into a receptacle over a large area and with a minimum of turbulence.

It is a further object of the invention to provide apparatus for evenly distributing the liquid supplied to the top of a plurality of vertical tubes such as are used in downflow evaporators, stripping columns, and the like, or to the top of packed towers such as are used in absorption or distillation processes.

Other objects of the invention are to provide liquid supplying and distributing means which is easily assembled, is non-corrodible, is non-clogging, and which may be readily cleaned and maintained.

Still other objects of the invention will be apparent from the description hereinafter given. For purposes of illustration, the invention will be shown and described as applied to a downflow evaporator.

In the accompanying drawings:

Fig. 3 is a horizontal sectional view on line 3—3 of Fig. 1.

Fig. 4 is a horizontal sectional view on line 4—4 of Fig. 1.

Figure 1:
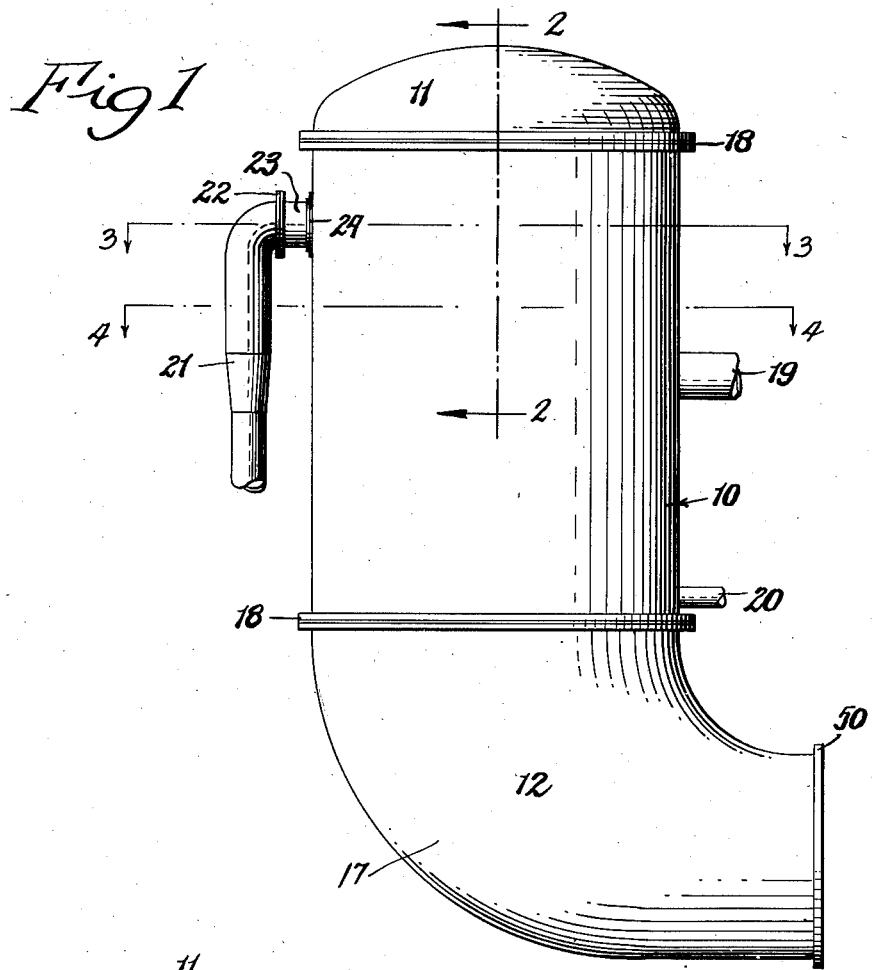
Fig. 1 is an elevational view of a downflow evaporator incorporating the liquid distribution apparatus of the present invention.
Figure 2:
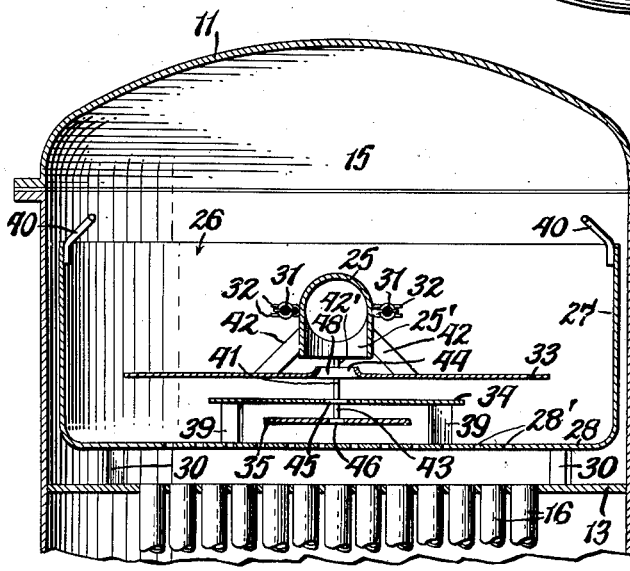
Fig. 2 is a vertical sectional view of the upper part of the evaporator shown in Fig. 1, taken on line 2—2 of Fig. 1.

Referring to the drawings, in which corresponding parts through the several views are indicated by the same reference characters, the numeral 10 indicates a downflow evaporator having a removable upper end head or cover 11 attached to its upper end and a collecting and outlet member 12 connected at its lower end. Two horizontal tube sheets, one of which is indicated at 13 are provided in evaporator 10. The space within the cap 11 and within the evaporator 10 above the tube sheet 13 constitutes a distribution chamber designated by the numeral 15. The tube sheets 13 are connected by vertical evaporator tubes 16, the space around these tubes constituting a steam chest, while the space below the tube sheet 14 and within the collecting member 12 constitutes a collection chamber formed by the collecting and outlet member 12.

The removable upper end head 11 and the collecting and outlet member 12 may be attached to the evaporator 10 by any suitable means. Conveniently such attachment may be by flanged joints 18 which are preferably provided with suitable gaskets. The steam chest is provided with a steam inlet 19 and a condensate outlet 20 extending through the wall thereof.

An inlet pipe 21 for the liquid to be evaporated is attached as by a flanged joint 22 to a nipple 23. The nipple 23 is shown as connected by a flanged union 24 to a horizontal feed pipe 25 which extends inwardly to the center of the chamber 15 and has a downwardly directed mouth or outlet 25'. Surrounding the feed pipe 25 is a distributing basket or tray 26 having a cylindrical wall 27, and a bottom plate 28 with uniformly spaced openings or perforations 28' therein. This basket 26 is radially spaced from the walls of the chamber 15 by a plurality of spacing fins 29 secured to the wall 27 of the basket 26, and is supported with its bottom 28 in spaced relation and parallel to the upper tube sheet 13 by feet 30 resting on this tube sheet.

The feed pipe 25 passes through the wall 27 of the basket or tray 26 and is secured thereto by T-bolts 31 extending between said wall and wings 32 which are secured to and project horizontally outwardly from the sides of the feed pipe 25. Handles 40 are provided on the rim of the basket or tray 26 for convenience in removing it from the chamber 15 when desired.

Horizontally disposed distribution plates 33, 34, and 35 are arranged in vertically spaced positions between the feed pipe 25 and the perforated bottom 28 of the basket or tray 26. These plates are supported on the bottom plate 28 of the basket 26 and in turn support the inner end of the feed pipe 25. To this end the intermediate distribution plate 34 is shown as having welded to its underside and near its periphery three feet 39 in the form of vertical rectangular plates arranged on edge and radially disposed. Similar feet or spacers 41 are welded to the upper face of the intermediate plate 34 near its periphery and support and are welded to the underside of the top distribution plate 33. A pair of diagonally disposed supports or struts 42 in the form of vertically disposed flat plates arranged in a plane at right angles to the feed pipe 25 are welded at their lower edges to the upper face of the top distribution plate 33 and to the side of the downwardly directed outlet 25' of this feed pipe. Additionally the feed pipe 25 can be supported by a vertically disposed rectangular plate or strut 42' welded along its lower edge to the top distribution plate 33 near its periphery and along its upper edge to the underside of the feed pipe 25. The lowermost or bottom distribution plate 35 is shown as hung from the intermediate distribution plate by three hangers 43 similar to the supports 41 between the distribution plates 33 and 34.

The distribution plates 33, 34, and 35 are concentrically arranged and each is provided with an orifice 44, 45 and 46, respectively, at the center thereof. These orifices are vertically aligned with the axis of the downwardly directed outlet or inner end 25' of the feed pipe 25. The lowermost or bottom distribution plate 35 is smaller in diameter than the intermediate distribution plate 34 and this intermediate distribution plate 34 is smaller in diameter than the top or uppermost distribution plate 33. The orifices 44, 45 and 46 are also similarly graduated in diameter the first mentioned being the largest and preferably having an upturned rim 48.

It should be understood that the number of distribution plates may vary with the size and type of the apparatus in connection with which they are used. Where a larger area is to be covered with liquid, additional plates of larger diameter may be employed at the top of the assembly. On the other hand, where the apparatus rquires the even distribution of liquid over a smaller area, it may be desirable to eliminate a plate and use only two.

The provision of the orifice 46 in the lowermost of the plates is also not a necessity under some conditions as where a bottom plate of very small diameter is employed.

The collecting and outlet member 12 may be provided with means such as the flange 50 for connection to evacuating and separation means (not shown).

The operation of the improved liquid distribution apparatus of the present invention is as follows:

Liquid from inlet or supply pipe 21 is introduced into the chamber 15 through the feed pipe 25. As the liquid passes from the downturned inner end 25' of this feed pipe a portion thereof passes through the orifice 44 in the top or uppermost distribution plate 33 while the remainder of said liquid is caused to flow outwardly over this top or uppermost distribution plate 33 and spills over its peripheral edge. The portion of the liquid passing through the orifice 44 of the top or uppermost distribution plate 33 is in turn divided into two portions, the first of which passes through the orifice 45 in the intermediate distribution plate 34, the second portion flowing outwardly over this intermediate distribution plate 34 and spilling over the outside edge thereof. In like manner a portion of the liquid passing through the orifice 45 runs on through the orifice 46 of the bottom or lowermost distribution plate 35 onto the bottom 28 of the basket or tray 26 while the remainder passes outwardly over the bottom distribution plate 35 and spills over its edge.

As a result of the divergent paths taken by it, the liquid cascades onto the bottom 28 of the basket or tray 26 in a radially spaced series of concentric circles and also, through the orifice 46, at the center thereof. Supplying the liquid over a large area of the bottom 28 of the basket 26 makes it possible to maintain a very small but nevertheless uniform head on this bottom of the basket and to avoid the excessive turbulence which would result from the impact of the full stream at only one or a few points. It will be perceived that unless the distribution plates 33, 34 and 35 are maintained level and parallel with the bottom 28 of the basket 26, the distribution of the liquid will not be uniform.

The liquid in the basket or tray 26 flows through the perforations 28' in its bottom 28 onto the upper tube sheet 13 and thence into the evaporator tubes 16. As will be seen most clearly in Fig. 5, the perforations 28' are located out of vertical alignment with the tubes 16 and hence the liquid does not drop freely through the tubes 16, but flows from the tube sheet 13 into the tubes 16 and is therefore distributed around the sides of these tubes. Evaporation of the liquid is thus materially aided. The alignment of the perforations 28' with the portions of the tube sheet 13 between the tubes 16 is maintained by the spacing fins 29 and the feed pipe 25 to which the basket or tray 26 is rigidly attached as hereinabove described. It is also desirable to have, where possible, the orifice 46 in the lowermost distribution plate 35 out of vertical alignment with any of the perforations 28' in the bottom 28 of the basket 26.

The tubes 16 are heated by steam admitted to the space around the evaporating tubes 16 through the steam inlet 19, the condensate being removed at 20. In the embodiment shown in the accompanying drawings, the vapor resulting from evaporation and the residual liquid pass from the bottom ends of the tubes 16 into the collection chamber within the collecting and outlet member 12 from which they are drawn off into a separator (not shown).

The evaporator described above may, if desired, be connected in series with other evaporators to provide multi-stage evaporation.

It will be understood, as hereinabove pointed out, that the liquid distribution apparatus of the present invention may be used in many other types of apparatus. Thus, for example, instead of feeding liquid to a downflow tube evaporator, the liquid may be fed to a stripping column in which steam would be passed through tubes countercurrent to the liquid in order to remove solvents. As another example, the apparatus of the present invention is adapted for use in porviding even distribution of a liquid to the top of an absorption or distillation tower which is packed with ceramic shapes or similar material.

The liquid distribution apparatus of the present invention will, as shown by the foregoing description, function most satisfactorily. There are no fine orifices in the construction and hence clogging of such orifices is not a problem. At the same time, the arrangement of the distribution plates is such that they may be easily removed by freeing the wings 32 from the T-bolts 31 and also easily assembly and easily cleaned. The apparatus is preferably constructed of metal. The metal employed is a matter of choice but it will often be desirable to form at least the nozzle, distribution plates, and distributing tray of non-corrosive metal such as stainless steel.

The size, number, and spacing of distribution plates to be used in any particular piece of apparatus will be largely a matter of choice. In making a decision on such matters, consideration must be given to the amount of liquid passing through the system, its rate of flow, the area to be covered, and the permissible deviation from optimum conditions in providing an even distribution over such area.

The size of the orifices through the distribution plates is, of course, variable. In general, it is desirable to form the orifices of such size that the amount of liquid permitted to flow through said orifices will cause uniform distribution to the tubes. As previously pointed out, the maintenance of the distribution plates level and parallel with the bottom of the basket into which the liquid is being fed is essential to an even distribution of liquid.

The configuration of the basket receptacle into which liquid is being fed will influence or determine the shape of the distribution plates in each instance since uniform distribution of the liquid will be most readily obtained when the shape of the plates conforms rather closely to the shape of the receptacle. Although the distribution plates have been shown as flat in vertical section, it will be understood that one or more or all may be, if desired, of concave or convex across section to cause desired variations in the flow over the various plates in order to achieve a uniform distribution of liquid.

The particular embodiment of the present invention which is illustrated in the drawings has been described in considerable detail together with certain modifications thereof. It will be realized, however, that the invention is susceptible of various other modifications and uses without departing from the spirit of the invention. Accordingly, it is desired that the invention should not be limited except by the scope of the appended claim.

I claim:

Apparatus for distributing liquid discharged from a vertical discharge pipe downwardly into the center of the upper chamber of an evaporator and which chamber is formed by a tubular side wall, an upper tube sheet of the evaporator, and a dome removably secured to the upper rim of said tubular side wall, which comprises a horizontal stationary bottom plate occupying substantially the full area of said chamber and having a series of uniformly spaced perforations therethrough, legs fast to and projecting downwardly from said perforated bottom plate and supporting said perforated bottom plate on said tube sheet in closely spaced juxtaposition thereto, side portions of said plate at at least spaced intervals around said plate being engageable with said side wall of said chamber to hold said plate in substantially centered relation to said chamber, a plurality of horizontal stationary distribution plates arranged concentric with said discharge, supports interposed between and at spaced distances around said plates and supporting said plurality of distribution plates on said perforated bottom plate in closely spaced juxtaposition to each other and to said perforated bottom plate and discharge, at least all but the lowermost of said plurality of distribution plates each having an orifice at the center thereof concentric with said discharge whereby the liquid flowing from said discharge is jointly received by said distribution plates and flows radially outwardly on said distribution plates to be discharged therefrom and maintain a very small uniform head of liquid on said perforated bottom plate.

ALBERT W. ECKSTROM.

REFERENCES CITED

The following references are of record in the file of this patent:

UNITED STATES PATENTS

| Number | Name | Date |
|---|---|---|
| 228,542 | Lister | June 8, 1880 |
| 910,074 | Logan | Jan. 19, 1909 |
| 1,250,258 | Westby | Dec. 18, 1917 |
| 1,449,313 | Bollmann | Mar. 20, 1923 |
| 2,005,600 | Tappen | June 18, 1935 |
| 2,314,754 | Baird | Mar. 23, 1943 |